(12) United States Patent
Red et al.

(10) Patent No.: US 12,485,759 B2
(45) Date of Patent: Dec. 2, 2025

(54) COMPONENT RETAINER

(71) Applicant: Textron Inc., Providence, RI (US)

(72) Inventors: Jordan M. Red, Martinez, GA (US);
Matthew D. Wilson, Graniteville, SC (US); Paul E. Morgan, Appling, GA (US)

(73) Assignee: Textron Innovations Inc., Providence, RI (US)

( * ) Notice: Subject to any disclaimer, the term of this patent is extended or adjusted under 35 U.S.C. 154(b) by 113 days.

(21) Appl. No.: 18/499,825

(22) Filed: Nov. 1, 2023

(65) Prior Publication Data
US 2025/0135887 A1    May 1, 2025

(51) Int. Cl.
*B60K 35/50* (2024.01)
*B60K 35/60* (2024.01)

(52) U.S. Cl.
CPC .............. *B60K 35/60* (2024.01); *B60K 35/50* (2024.01)

(58) Field of Classification Search
CPC ...................................................... B60K 35/50
USPC ....................................................... 248/27.3
See application file for complete search history.

(56) References Cited

U.S. PATENT DOCUMENTS

| | | | |
|---|---|---|---|
| 3,164,873 A * | 1/1965 | Marek | H04N 5/645 248/27.3 |
| 4,152,039 A | 5/1979 | Shah | |
| 4,184,008 A | 1/1980 | Watakabe | |
| 4,191,236 A | 3/1980 | Duran | |
| 4,394,097 A | 7/1983 | Horlacher | |
| 4,895,485 A | 1/1990 | Guevara et al. | |
| 5,199,894 A | 4/1993 | Kalny et al. | |
| 5,362,187 A | 11/1994 | Scalise | |
| 5,399,096 A | 3/1995 | Quillet et al. | |
| 5,511,919 A | 4/1996 | Scalise | |
| 5,604,645 A * | 2/1997 | Weaver | B60R 1/072 248/27.3 |
| 5,632,584 A | 5/1997 | Acevedo | |
| 5,788,268 A * | 8/1998 | Goss | B60R 21/2035 280/728.2 |
| 6,053,043 A * | 4/2000 | Dannenberg | G04B 37/144 73/431 |
| 6,174,118 B1 | 1/2001 | Rebers et al. | |
| 6,183,293 B1 | 2/2001 | Kieninger | |
| 6,227,782 B1 | 5/2001 | Bowling et al. | |
| 6,860,693 B2 | 3/2005 | Jones et al. | |
| 6,966,788 B1 | 11/2005 | Ruhl | |
| 7,207,762 B2 | 4/2007 | Teal | |
| 7,384,312 B2 | 6/2008 | Van Der Mee et al. | |

(Continued)

FOREIGN PATENT DOCUMENTS

BR    102020018023 A2    5/2021
EP    2053292 B1    12/2011

(Continued)

*Primary Examiner* — Bradley Duckworth
(74) *Attorney, Agent, or Firm* — Sandberg Phoenix & von Gontard, P.C.

(57) ABSTRACT

A component retainer, wherein the retainer comprises an annular-shaped body defining a central aperture, and a plurality of engagement tabs extending substantially orthogonally from the annular-shaped body. Each engagement tab comprises an engagement tab body and a retaining tooth integrally formed with the engagement tab body and extending radially inward toward a center of the central aperture.

20 Claims, 7 Drawing Sheets

(56) References Cited

U.S. PATENT DOCUMENTS

| | | |
|---|---|---|
| 7,806,621 B2 | 10/2010 | Leroyer |
| 7,845,963 B2 | 12/2010 | Gastineau |
| 7,914,316 B2 | 3/2011 | D'Addario |
| 8,002,566 B1 | 8/2011 | Baumann et al. |
| 8,092,132 B2 | 1/2012 | Zink et al. |
| 8,740,530 B2 | 6/2014 | Cosenza et al. |
| 8,915,689 B2 | 12/2014 | Demland |
| 9,243,697 B2 | 1/2016 | Schroeder et al. |
| 9,371,142 B2 | 6/2016 | Rodig |
| 9,435,370 B2 | 9/2016 | Hughes et al. |
| 9,441,663 B2 | 9/2016 | Coffland et al. |
| 9,841,046 B2 | 12/2017 | Hess et al. |
| 10,215,213 B2 | 2/2019 | Forrest et al. |
| 10,323,678 B2 | 6/2019 | Hess et al. |
| 10,753,383 B2 | 8/2020 | Hess et al. |
| 10,801,540 B2 | 10/2020 | Hess et al. |
| 10,823,919 B2 | 11/2020 | Koch et al. |
| 11,111,950 B2 | 9/2021 | Hess et al. |
| 11,549,547 B2 | 1/2023 | Yuan et al. |
| 2004/0198093 A1 | 10/2004 | Fan |
| 2006/0223372 A1 | 10/2006 | Van Der Mee et al. |
| 2010/0181758 A1 | 7/2010 | Chen |
| 2013/0072048 A1 | 3/2013 | Schafer et al. |
| 2014/0026382 A1 | 1/2014 | Smith et al. |
| 2016/0238050 A1 | 8/2016 | Gimenes et al. |
| 2017/0181308 A1 | 6/2017 | Swatko et al. |
| 2022/0235812 A1 | 7/2022 | Hess et al. |

FOREIGN PATENT DOCUMENTS

| | | |
|---|---|---|
| EP | 3589850 A1 | 1/2020 |
| EP | 3867540 A1 | 8/2021 |
| JP | 2004183785 A | 7/2004 |
| TW | I603549 B | 10/2017 |

\* cited by examiner

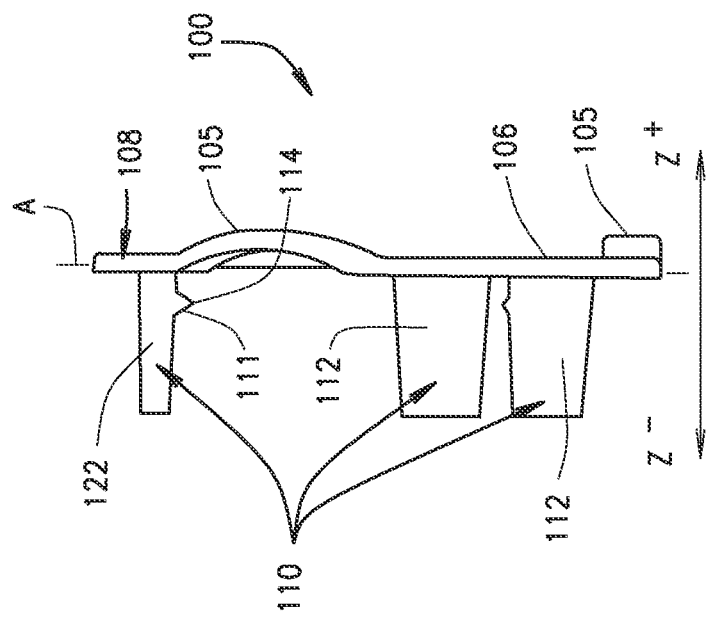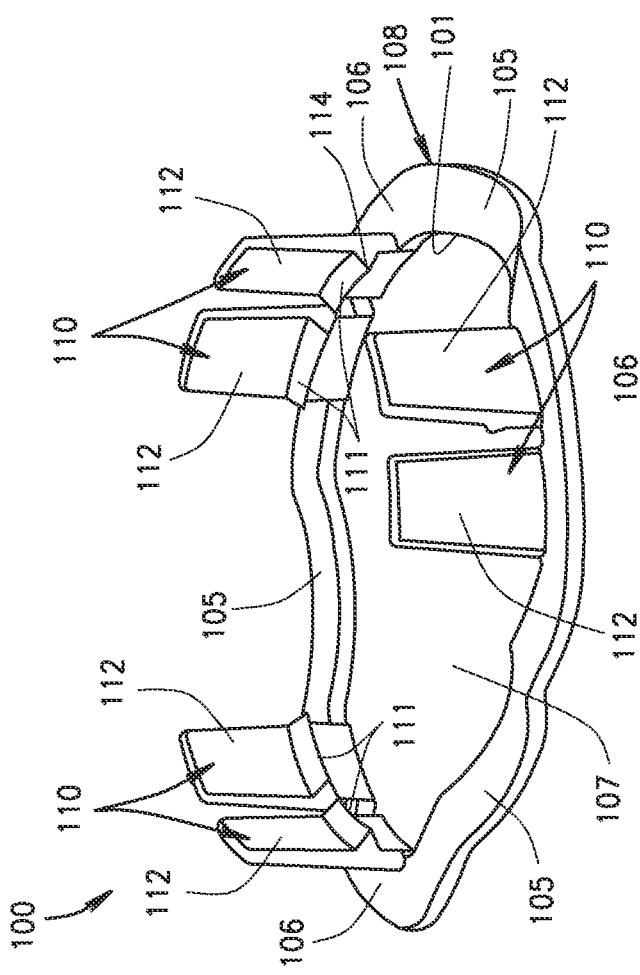

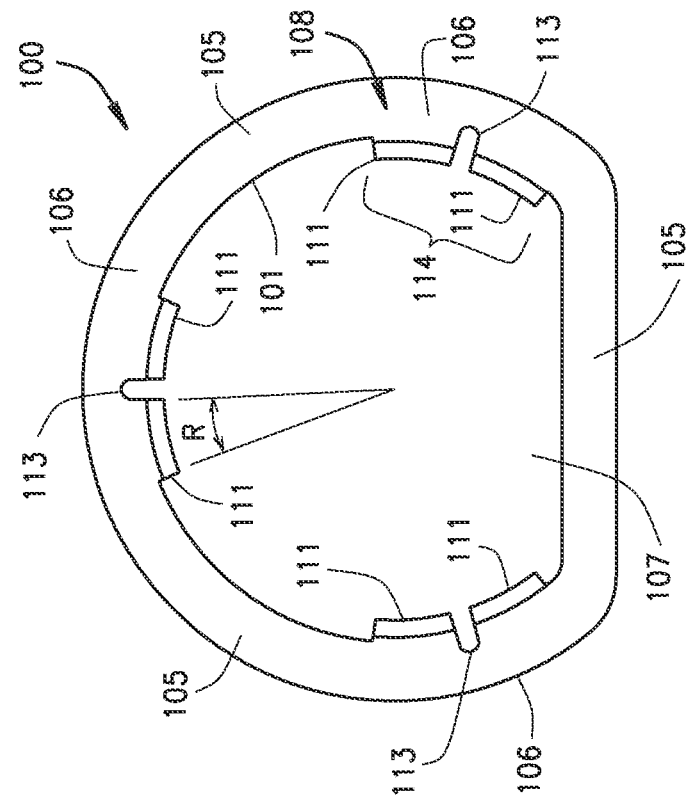
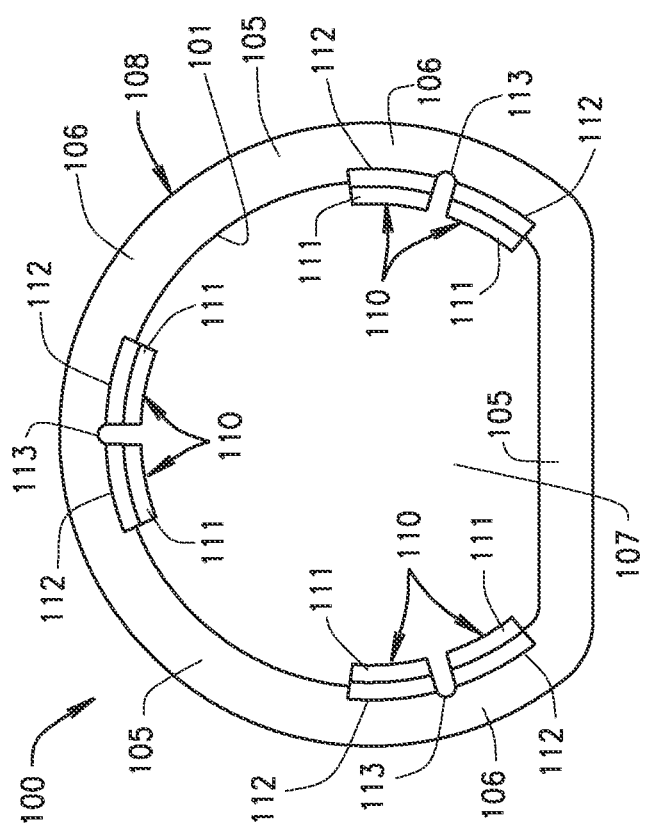
FIG. 2D
FIG. 2C

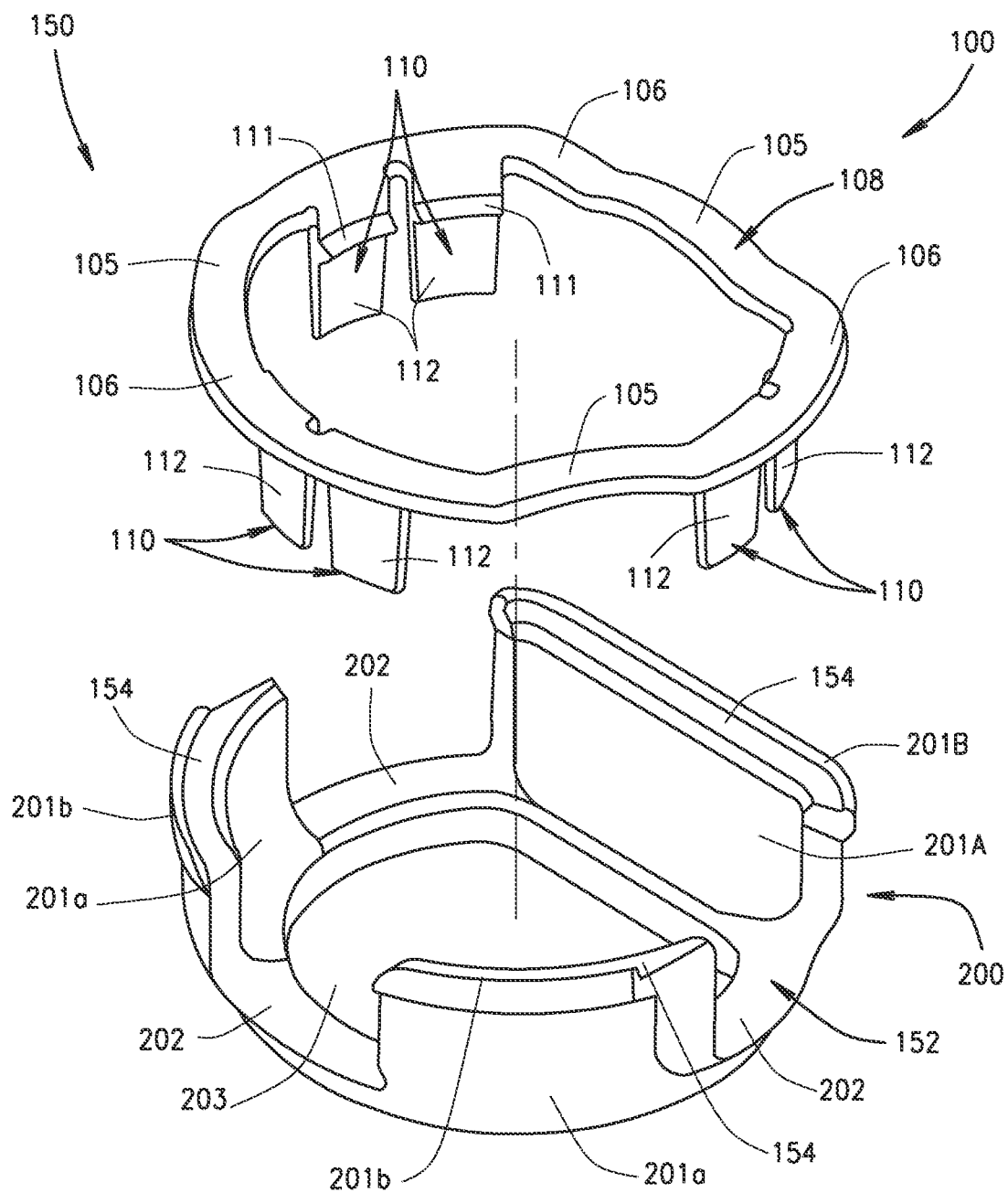
F I G . 3

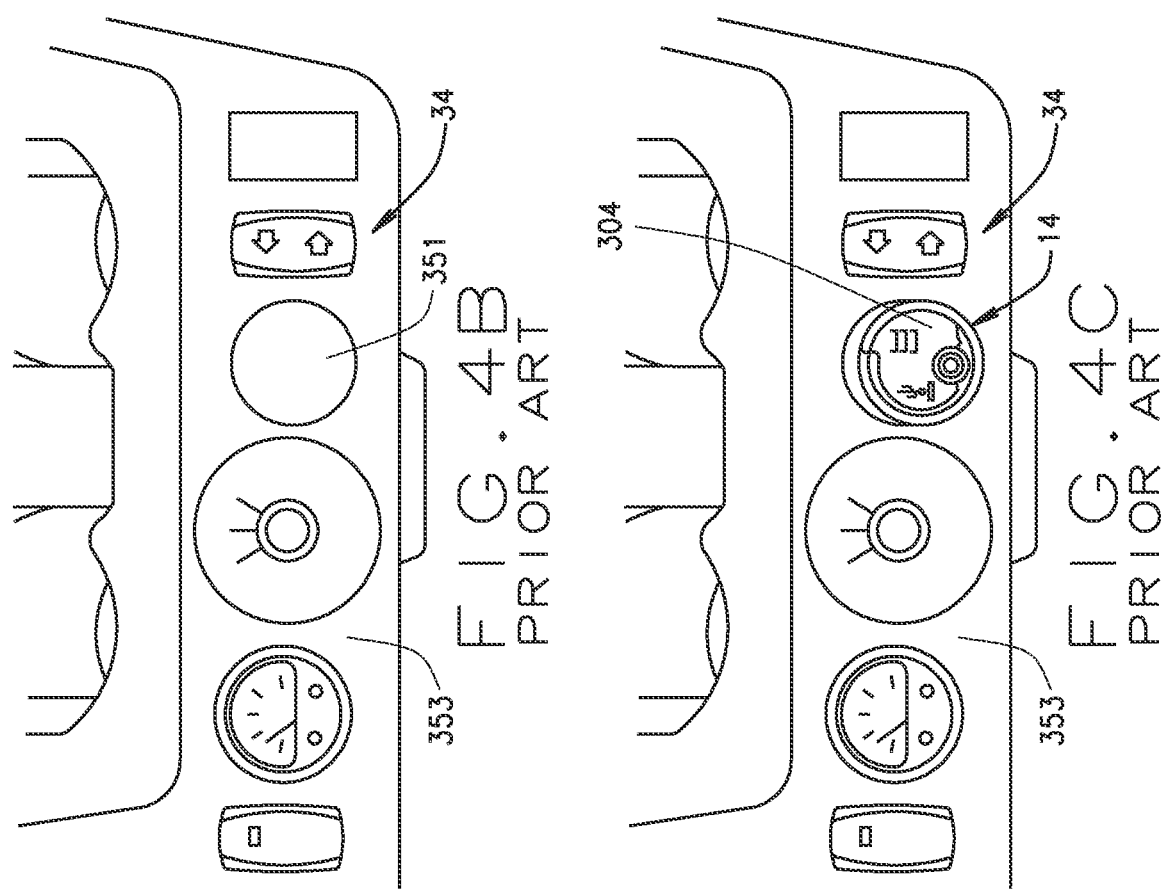
FIG. 4B
PRIOR ART
FIG. 4C
PRIOR ART
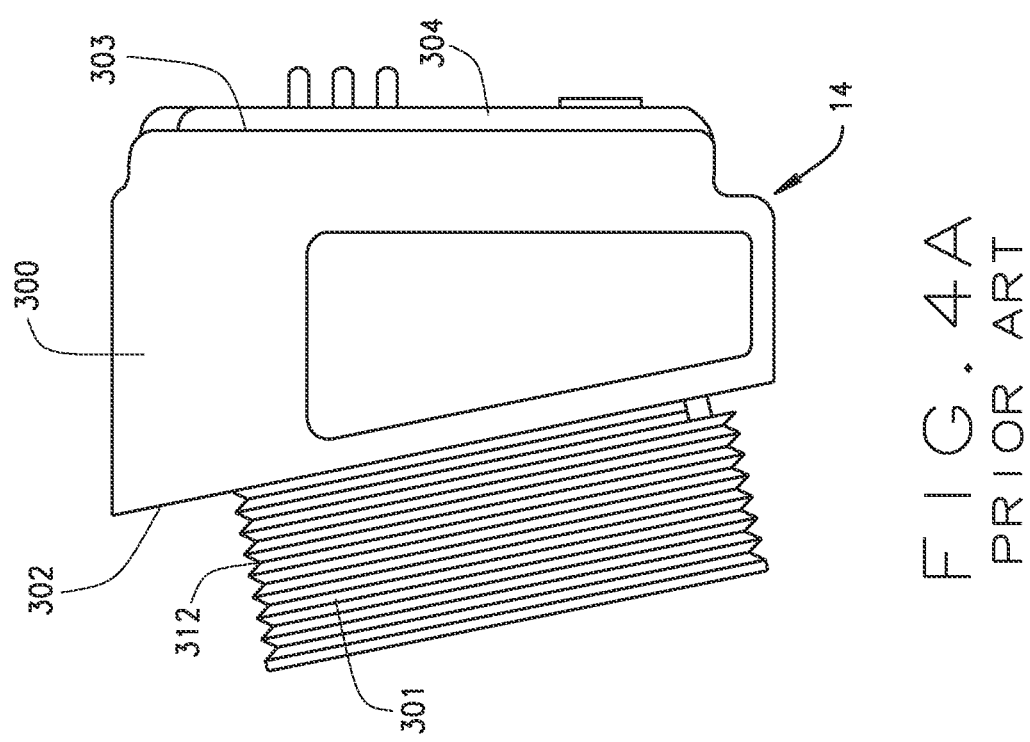
FIG. 4A
PRIOR ART

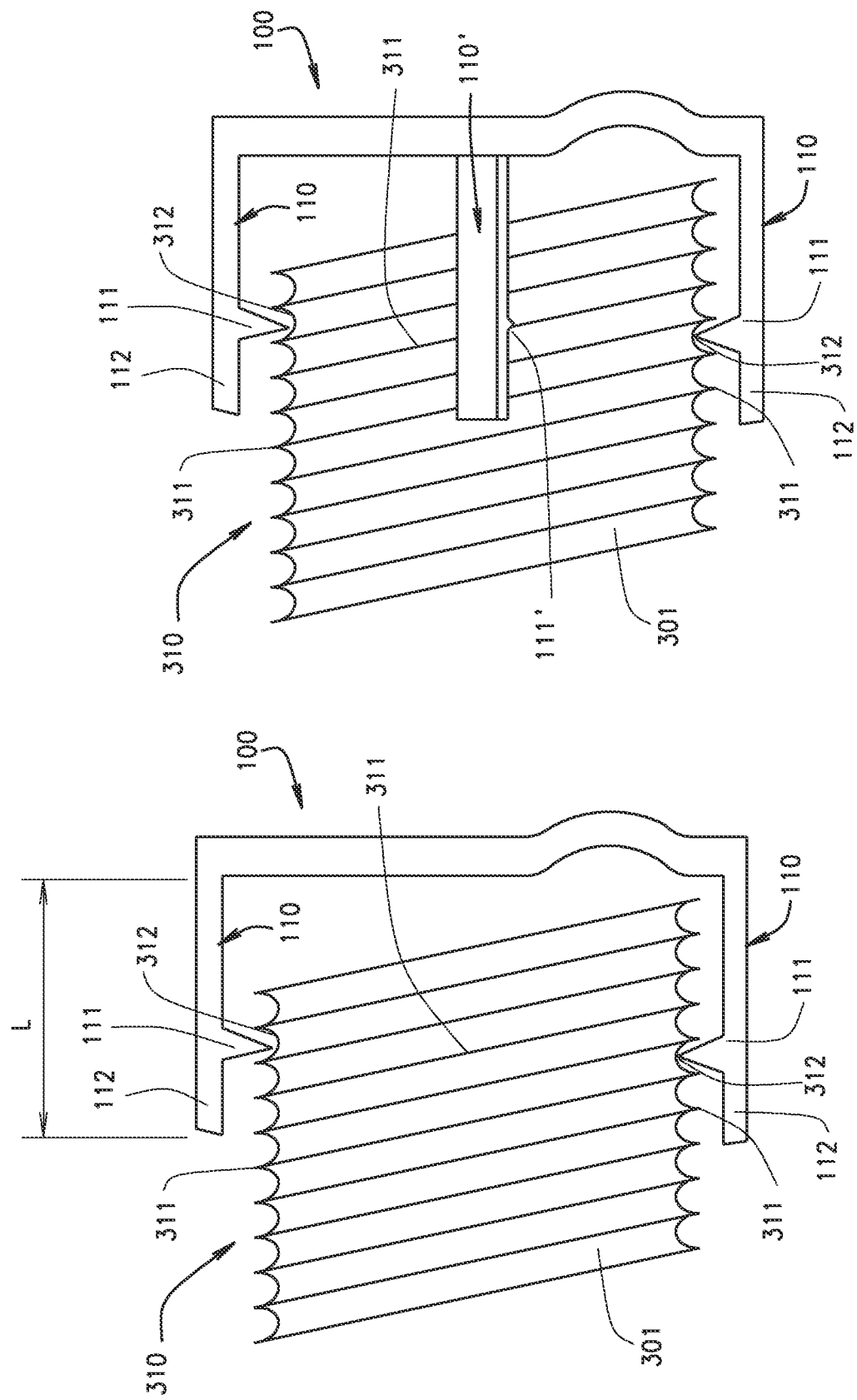

COMPONENT RETAINER

FIELD

The present teachings relate to devices for retaining a component for a panel, and more particularly to push-on solutions for retaining threaded components, particularly USB components, on a panel.

BACKGROUND

The statements in this section merely provide background information related to the present disclosure and may not constitute prior art.

A panel, such as a vehicle dashboard, often requires the installation and replacement of various components. Once installed, these components must also be retained in the panel. Various solutions exist for installing and retaining components in a panel. Threaded components are often installed through the use of a threaded nut that engages with component threads and retains the component against the panel. However, installation of such components can be ergonomically challenging in confined environments and can require complex, repetitive motions. Thus, there is a need for component retainer solutions that emphasize ergonomics and ease of use.

SUMMARY

In various embodiments, the present disclosure provides a component retainer, wherein the retainer comprises an annular-shaped body defining a central aperture, and a plurality of engagement tabs extending substantially orthogonally from the annular-shaped body. Each engagement tab comprises an engagement tab body and a retaining tooth integrally formed with the engagement tab body and extending radially inward toward a center of the central aperture.

In various other embodiments, the present disclosure provides a component retainer assembly, wherein the assembly comprises a component retainer and an installation tool. The component retainer comprises a retainer annular-shaped body defining a central retainer aperture, and a plurality of engagement tabs extending substantially orthogonally from the retainer annular-shaped body. Each engagement tab comprises an engagement tab body and a retaining tooth integrally formed with the engagement tab body and extending radially inward toward a center of the central aperture. The installation tool comprises an installation tool annular-shaped body defining a central tool aperture, and a plurality of retainer retention and installation legs extending substantially orthogonally from the tool annular-shaped body.

In yet other embodiments, the present disclosure provides a vehicle, wherein the vehicle comprises passenger compartment comprising a seating structure and a dash console; and a component retainer structured and operable to retain a threaded component within an opening in the dash console. In various embodiments, the component retainer comprises a annular-shaped body defining a central aperture, and a plurality of engagement tabs extending substantially orthogonally from the annular-shaped body. Each engagement tab comprises an engagement tab body and a retaining tooth integrally formed with the engagement tab body and extending radially inward toward a center of the central aperture.

This summary is provided merely for purposes of summarizing various example embodiments of the present disclosure so as to provide a basic understanding of various aspects of the teachings herein. Various embodiments, aspects, and advantages will become apparent from the following detailed description taken in conjunction with the accompanying drawings which illustrate, by way of example, the principles of the described embodiments. Accordingly, it should be understood that the description and specific examples set forth herein are intended for purposes of illustration only and are not intended to limit the scope of the present teachings.

DRAWINGS

The drawings described herein are for illustration purposes only and are not intended to limit the scope of the present teachings in any way.

FIG. 2A shows an isometric view of a component retainer of the component retainer assembly in accordance with various embodiments of the present disclosure.

FIG. 2B shows a side view of the component retainer shown in FIG. 2A in accordance with various embodiments of the present disclosure.

FIG. 2C shows a front view of the component retainer shown in FIGS. 2A and 2B in accordance with various embodiments of the present disclosure.

FIG. 2D shows a rear view of the component retainer shown in FIGS. 2A, 2B and 2C in accordance with various embodiments of the present disclosure.

FIG. 3 shows an isometric depiction of the component retainer assembly in accordance with various embodiments of the present disclosure.

FIG. 4A shows a side view of an exemplary threaded fixture for which the component retainer shown in FIGS. 2A, 2B, 20, 2D and 3 is structured and operable to removably engage to secure the threaded fixture to a panel of a vehicle, in accordance with various embodiments of the present disclosure.

FIG. 4B shows a front view of an exemplary vehicle instrument panel with a hole for installation of a threaded fixture utilizing the component retainer shown in FIGS. 2A, 2B, 20, 2D and 3, in accordance with various embodiments of the present disclosure.

FIG. 4C shows a front view of the exemplary vehicle instrument panel shown in FIG. 4B having the exemplary threaded fixture shown in FIG. 4A secured to the instrument panel utilizing the component retainer shown in FIGS. 2A, 2B, 2C, 2D and 3, in accordance with various embodiments of the present disclosure.

FIG. 6A shows a side view of an exemplary component retainer engaging with a threaded fixture in accordance with various embodiments of the present disclosure.

FIG. 6B shows a side view of an exemplary component retainer engaging with a threaded fixture in accordance with various other embodiments of the present disclosure.

Corresponding reference numerals indicate corresponding parts throughout the several views of drawings.

DETAILED DESCRIPTION

Figure 1:
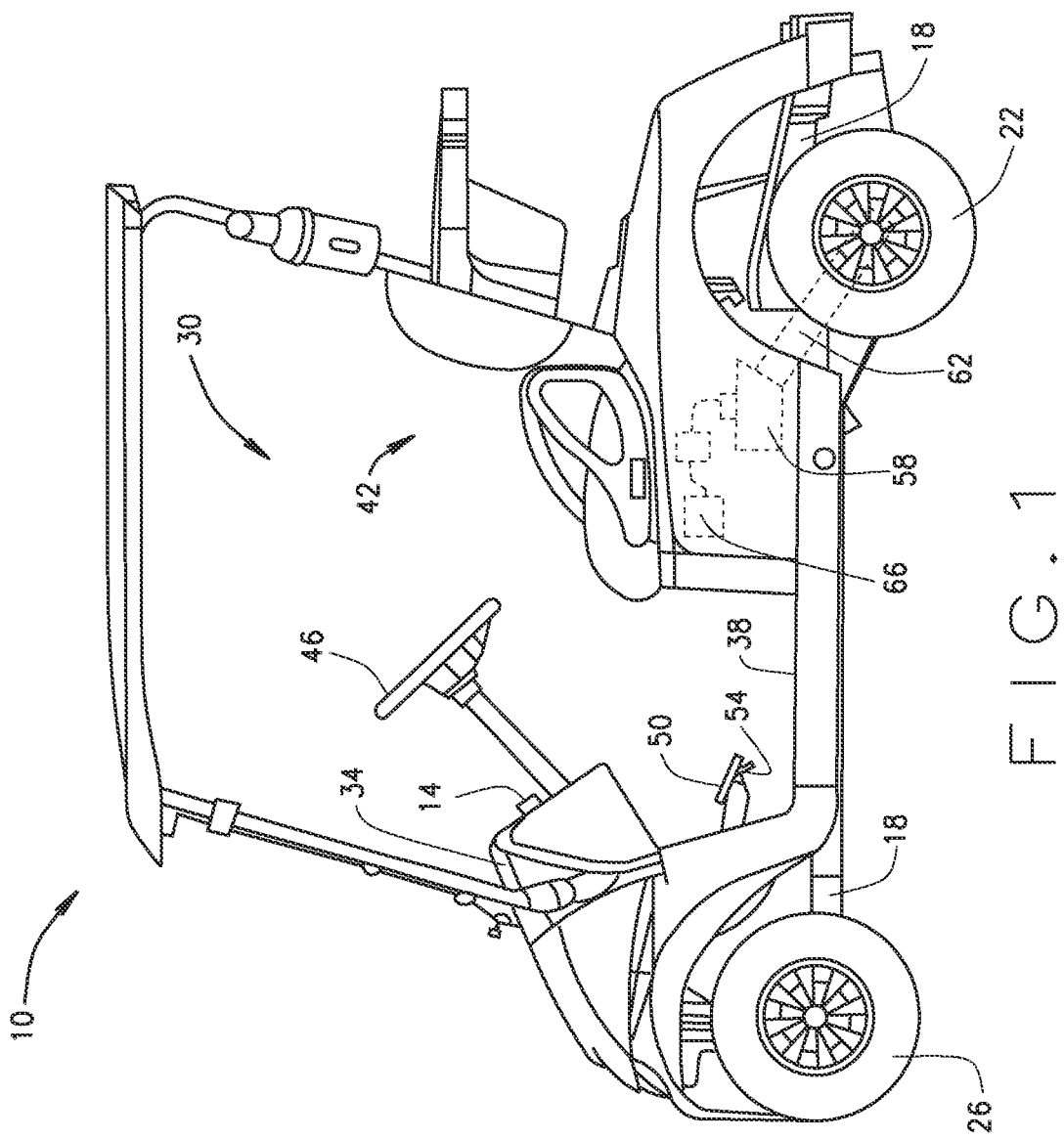
FIG. 1 is an exemplary side view of a vehicle comprising one or more component retainer assembly in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises", "comprising", "including", and "having" are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on", "engaged to or with", "connected to or with", or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on", "directly engaged to", "directly connected to", or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between", "adjacent" versus "directly adjacent", etc.).

As used herein the phrase "operably connected to" will be understood to mean two or more elements, objects, devices, apparatuses, components, etc., that are directly or indirectly connected to each other in an operational and/or cooperative manner such that operation or function of at least one of the elements, objects, devices, apparatuses, components, etc., imparts or causes operation or function of at least one other of the elements, objects, devices, apparatuses, components, etc. Such imparting or causing of operation or function can be unilateral or bilateral.

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

Moreover, it will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) taught herein, and because many modifications may be made in the embodiments described herein, it is to be understood that the details herein are to be interpreted as illustrative and non-limiting.

Referring now to FIG. 1, in various embodiments the present disclosure generally provides a vehicle 10, e.g., a golf car, comprising one or more threaded component 14 secured to an instrument panel 34 by a component retainer 100 (shown in FIGS. 2A-2D). Although the vehicle 10 is exemplarily illustrated in the various figures as a golf car, and will be exemplarily described herein with regard to a golf car, the vehicle 10 can be any vehicle having one or more threaded components 14 securely affixed to a panel thereof (e.g., a dash console 34) utilizing the component retainer 100, and remain within the scope of the present disclosure. For example, it is envisioned that the vehicle 10 can be a golf car, a passenger transport or shuttle vehicle, a maintenance or ground care utility vehicle, a turf mower, a cargo vehicle, or any other vehicle.

The vehicle 10 generally includes a chassis or frame 18, a pair of rear wheels 22 and a pair of front wheels 26 operationally connected to the chassis 18, and a passenger compartment 30. The passenger compartment 30 generally includes an instrument panel or dash console 34, a floorboard 38, and a passenger seating structure 42. The instrument panel/dash console 34 can include one or more instrument displays, gauges, vehicle control devices, storage compartments and various vehicle components. In various embodiments, the various vehicle components can include one or more threaded component 14. The passenger compartment 30 additionally includes a steering wheel 46 for use by the passenger/user to control the directional movement of the vehicle 10, a brake pedal 50 for use by the passenger/user to control slowing and stopping of the vehicle 10, and an accelerator pedal 54 for use by the operator to control the torque delivered by a prime mover 58 (described below) to one or more of the rear and/or front wheels 22 and/or 26. Particularly, the prime mover 58 is operatively connected to a drivetrain 62 that is operatively connected between the prime mover and at least one of the rear and/or front wheels 22 and/or 26.

The vehicle 10 further comprises a vehicle electrical power source 66 (e.g., one or more battery) that is structured and operable to provide electrical power to various electrical components of the vehicle 10 (e.g., a vehicle motor if the prime mover 58 is an electric motor, and other vehicle electrically operated modules and components). The prime mover 58 can be any device that is structured and operable to generate torque (e.g., motive force, e.g., power) utilized to provide motive force for the vehicle 10 via the drivetrain 62. For example, in various embodiments, the prime mover 58 can be an internal combustion engine (ICE), an electric motor, a hybrid combination of an ICE and an electric motor, or any other suitable motive power source and remain within the scope of the present disclosure.

Referring now to FIGS. 2A and 2B, in various embodiments the component retainer 100 comprises a generally annular or ring-shaped body 108 having a plurality of engagement tabs 110 integrally formed with and extending generally orthogonally from the body 108. The annular body 108 defines a central aperture 107. The annular body 108 is a generally flat ring having a plurality of substantially flat sections 106 and a plurality of arcuate spring features 105 formed between the substantially flat sections 106. Particularly, the plurality of spring features 105 and the plurality of flat sections 106 alternate with one another around the annular body 108. As seen in FIG. 2B, the spring features 105 arc outward in a $Z^+$ direction that is generally perpendicular to a plane A defined by the generally flat annular body 108.

The plurality of engagement tabs 110 are integrally formed with the component retainer 100 such that each engagement tab 110 is integrally formed with and extends from a respective one of the flat sections 106, and such that each engagement tab 110 projects outward in the Z-direction, generally orthogonally to the plane A. More particularly each engagement tab 110 projects in the Z-direction opposite the $Z^+$ direction in which each arcuate spring feature 105 arcs. Each engagement tab 110 comprises a body 112 and a retaining tooth 111 integrally formed therewith and extending radially inward (e.g., extending toward a center of the aperture 107 of the annular body 108). In various embodiments the body 112 of the engagement tabs 110 can be generally flat. Alternatively, in various embodiments the body 112 of the engagement tabs 110 can be curved across a width of the respective engagement tab 110, with a radius of curvature R. In various embodiments each retaining tooth 111 extends across the entire width of the respective engagement tab 110. Alternatively, each retaining tooth 111 can extend across only a portion of the width of the respective engagement tab 110. In various embodiments each retaining tooth 111 can have a generally triangular prism shape (i.e., a triangular lateral cross-sectional shape) with an apex projecting radially inward toward the center of the aperture 107.

As shown in FIGS. 2A-2D, in various embodiments the engagement tabs 110 can be disposed around the annular body 108 in sets where each set comprises two or more adjacent engagement tabs 110. Alternatively, in various embodiments, the engagement tabs 110 can be disposed around the annular body 108 as single engagement tabs 110. In various other embodiments, the engagement tabs 110 can be disposed around the annular body 108 such that some are provided as single engagement tabs 110 and others are provided as sets of two or more engagement tabs 110. In various embodiments the annular body 108 can include one of one or more flex recess or notch 113 formed in an inner perimeter edge 101 of the annular body 108 between adjacent engagement tabs 110 within each set of engagement tabs 110. Each flex recess 113 is substantially an indent formed in the corresponding flat section 106 of the annular body 108. In various alternative embodiments, there can be sets of engagement tabs 110 that comprise three, four, or more adjacent engagement tabs 110, wherein each adjacent engagement tab 110 can optionally be separated by a flex recess 113.

Although the component retainer 100 is exemplarily shown in FIGS. 2A-2D as being roughly shaped like a capital letter 'D,' the component retainer 100 can have any of a variety of closed loop shapes, including but not limited to polygons, circles, and closed loops comprising both straight lines and curves. In various alternative embodiments, the plurality of spring features 105 and plurality of flat sections 106 can be arranged in regular alternation, or they can be arranged in alternating pairs, or in any other arrangement.

The component retainer 100 is constructed of a generally stiff but flexible and resilient material that allows the engagement tabs 110 to stiffly flex radially outward away from the center of the aperture 107 but will resiliently force the engagement tabs 110 back radially inward toward the center of the aperture 107. For example, the component retainer 100 can be constructed from any such material known to one of ordinary skill in the art such as spring steel, a rubber, a polymer, a polymer composite, or any other suitable stiff but flexible lightweight material.

Referring now to FIG. 3, in various embodiments the present disclosure additionally provides a component retainer assembly 150 that comprises the component retainer 100 and an installation tool 200 having a substantially annular or ring-shaped body 152 that defines a central tool aperture 203. The installation tool 200 comprises a plurality of retainer retention and installation legs or walls 201A that extend substantially orthogonally from the body 152. Each retainer retention and installation leg 201A includes a raised lip 201B formed at a distal end thereof that defines a retainer retention channel 154 disposed at the distal end of each retainer retention and installation leg 201A. The installation tool 200 additionally comprises a plurality of engagement tab receptacles 202 formed between the retainer retention and installation legs 201A. The plurality of engagement tab receptacles 202 are sized and shaped to receive the engagement tabs 110 of the component retainer 100 when the body 108 of the component retainer 100 is disposed therein, as described below. In various exemplary embodiments, the installation tool annular shaped body 152 has substantially the same size and shape as the component retainer body 108 that is complementary to the component retainer 100.

Figure 5:
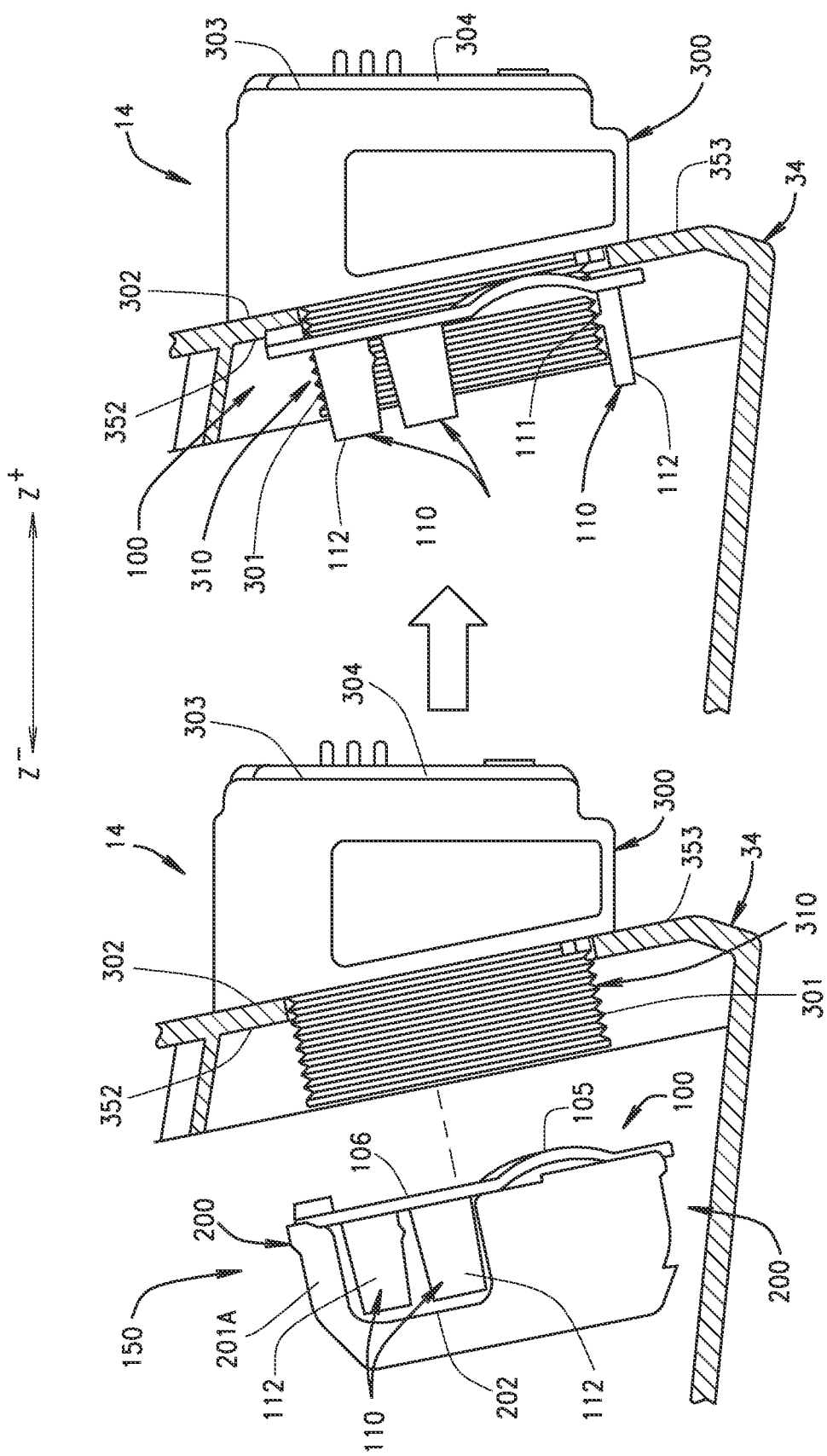
FIG. 5 shows a side view of a method for installation of the component retainer shown in FIGS. 2A, 2B, 20, 2D and 3 onto an exemplary threaded fixture, in accordance with various embodiments of the present disclosure.

In use to install the component retainer 100 on a threaded component, such as threaded component 14 shown in FIGS. 1 and 4A, so as to secure the threaded component to a panel 34 of the vehicle 10, the retainer retention and installation arms 201A of installation tool 200 are engaged with the component retainer body 108 between the engagement tabs 110. More particularly, the retainer retention channels 154 of the retention and installation arms 201A receive the component retainer body 108 therein and the plurality of engagement tabs 100 extend into and are disposed within the engagement tab receptacles 202. Referring now to FIGS. 4A, 4B, 4C, 5 and 6 the exemplary threaded component 14 comprises a head 300 having a threaded neck 301 extending from a rear face 302 of the head 300. The head 300 also includes a front user interface 303, exemplarily disposed behind a movable cover 304. FIGS. 4B, 4C and 5 exemplarily illustrate instrument panel 34 of the vehicle 10 into which the threaded component 14 can be installed. The instrument panel 34 comprises a rear face 352, a front face 353, and at least one component opening, aperture or hole 351 that is sized and shaped to receive the threaded neck 301. The component threaded neck 301 is inserted through the component opening 351 and extends past rear face 352 of the instrument panel 34 such that the component user interface 300 is disposed adjacent front face 353 of the instrument panel 34 and is visible and accessible to an occupant of the vehicle 10.

As shown in FIG. 5, the component retainer 100 is used to secure the threaded component 14 to the instrument panel 34 such that the rear face 302 of the threaded component head 300 is flush with the front face 353 of the instrument panel 34. In various embodiments, in order to install the component retainer 100 onto the threaded neck 301 to secure the threaded component 14 to the instrument panel 34 the component retainer 100 is placed within the retainer retention channels 154 of the installation tool 200 as described above. The user then grasps the installation tool 200 and uses it to guide the component retainer body 108 over and around threaded component neck 301 such that the threaded component neck 301 is inserted through the component retainer aperture 107. Thereafter, the user presses or forces the component retainer 100 along the length of the threaded component neck 301 such that the teeth 111 of the engagement tabs 112 contact the threads 310 of the threaded component neck 301. As the component retainer 100 is pushed or forced along the length of the threaded neck 301 the body 108 of each engagement tab 110 will flex radially outward away from the threaded neck 301 as each respective tooth 111 is forced over an apex 311 of each thread, then be forced radially inward toward the threaded neck 301, via the stiff resilience of engagement tab bodies 112, such that each respective tooth 111 enters a nadir 312 between the thread apices 311 of the threaded neck 301. The component retainer 100 is then pressed along the threaded neck 301 until the plurality of spring features 105 are pressed against the rear face 352 of the instrument panel 34.

Once the component retainer 100 is pressed against the rear face 352 of the instrument panel 34, the tooth 111 of one or more engagement tab 110 will be disposed within and engaged with the nadir 312 of one or more thread 310 of the threaded neck 301. Moreover, the tooth 111 of one or more engagement tab 110 will be retained within the respective nadir 312 and the component retainer body 107 will be pressed again the instrument panel rear face 352, thereby securing the threaded component 14 within the component opening 351 of the instrument panel 34. Additionally, as the component retainer body 108 is pushed against the rear face 352 of the instrument panel 34 the spring features 105 contact the rear face. Subsequent force toward the instrument panel rear face 352 on the component retainer 100 will cause the spring features 105 to flex in the Z-direction allowing the engagement tab teeth 111 to engage the nadir(s) 312 closer to the rear face of the instrument panel 34. Consequently, the force in the $Z^+$ directions applied by the flexed spring features 105 will securely hold the component retainer body 108 against the instrument panel rear face 352 and the engagement tab teeth 111 within the respect nadirs 312. This in turn will pull the rear face 302 of the threaded component head 300 securely against the front face 353 of the instrument panel 34, thereby securely retaining the threaded component 14 within the component opening 351 and against the instrument panel front face 353 and reduces or eliminates rattling and movement of the threaded component 14 within component opening 351. In this way, the component retainer 100 securely holds and retains the threaded component 14 within the component opening 351 and to the instrument panel 34 without the use of a threaded nut or other mechanical component. Once the component retainer 100 has been secured against the instrument panel rear face 352 and the component 14 secured within the instrument panel opening 351, the installation tool 200 can be withdrawn and removed from around the component neck 301.

Although the exemplary installation method depicted in FIGS. 3, 4A, 4B, 4C, 5 and 6 utilize the installation tool 200, in various alternative embodiments, a user can manually press the component retainer 100 onto the threaded neck 301 as described above, to secure and retain the threaded component 14 within the component opening 351 and to the instrument panel 34 without use of the installation tool.

In various exemplary embodiments, the structure of the component retainer 100 provides various benefits that make it easy to use. For example, in various exemplary embodiments, the plurality of engagement tabs 110 are strategically formed and distributed around the body 108 to enable the component retainer 100 to securely engage and grip the threaded neck 301. As shown in FIG. 6A, by strategically positioning engagement tab 110 at particular locations relative to one another along the component retainer 100, the teeth 111 of the engagement tabs 110 are able to accommodate the helical or corkscrew pattern or shape of the threads on the threaded neck 301 and thereby engage with the thread nadirs 312 without being caught on the thread apices 311. As shown in FIG. 6B random positioning of engagement tabs 110 can result in situations where the tooth 111 of one or more the engagement tabs 110 is not all able to engage with the thread nadirs 312. For example, as shown in FIG. 6B, the placement of the engagement tab 110' centered relative to the other visible engagement tabs 110 is such that due to the helical shape of the threads on the threaded neck 301, the tooth 111' cannot engage with a thread nadir 312 and instead rests on top of a thread apex 311. Similarly, if any of the engagement tab and teeth 111 are formed such that a width thereof is too large, then the teeth 111 will unavoidably contact a thread apex 311 and thereby fail to fully engage with a thread nadir 312 and securely grip the threaded neck 301. Additionally, in various embodiments, in order to ensure engagement of the teeth 111 with the nadirs 312 of the threads 310, and hence better securement of the component 14 to the dash console 34 of vehicle 10, the teeth 111 can be formed and disposed at different locations along a length L of each respective engagement tab 110 to thereby better coordinate with the helical curvature, slope or angle of the threads 310. Furthermore, as described above, the force in the $Z^+$ directions applied against the rear face 352 of the instrument panel 34 by the flexed spring features 105 will securely engage the thread nadirs 312 and thereby securely hold the component retainer body 108 against the instrument panel rear face 352.

Furthermore, engagement of engagement tab teeth 111 with the thread nadirs 312 is further enabled by the recesses 113 formed between the engagement tabs 110 and/or the use of flexible materials to fabricate the component retainer 100. Particularly, the recesses 113 and/or the flexible material of the flexible tabs 110 and the base 108 allow the engagement tabs 110 and the base 108 to bend or twist slightly to accommodate the helical curvature, slope or angle of the threads 310 on the threaded neck 301. More particularly, the flex recesses 113 enable the engagement tabs 110 to bend and/or twist relative to one another, thereby further improving the likelihood of the teeth 111 securely engaging the threaded neck 301. Furthermore, the use of a stiff but flexible and resilient material in construction of the component retainer 100 better enables the component retainer 100 to receive the threaded neck 301. Still further, the use of a stiffly flexible and resilient material enables a user to disengage the component retainer 100 from the threaded neck 301 by pulling the engagement tabs 112 radially outward, thereby, disengaging the teeth 111 from the threads of the threaded neck 301.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

What is claimed is:

1. A component retainer, said retainer comprising:
   an annular-shaped body defining a central aperture, the annular-shaped body and the central aperture defining a retainer body plane in which the annular-shaped body and the central aperture are disposed, the annular-shaped body having a flat first face and an opposing flat second face that are coplanar with the retainer body plane; and
   a plurality of engagement tabs integrally formed with and extending substantially orthogonally from the flat first face of the annular-shaped body, wherein each engagement tab comprises an engagement tab body and a retaining tooth integrally formed with the engagement tab body and extending radially inward toward a center of the central aperture.

2. The retainer of claim 1, wherein the annular-shaped body comprises a plurality of flat sections and a plurality of arcuate spring features formed between the flat sections.

3. The retainer of claim 2, wherein the plurality of engagement tabs comprises a plurality of sets of engagement tabs comprising two or more adjacent engagement tabs.

4. The retainer of claim 3 further comprising a plurality of flex recesses formed in an inner perimeter edge of the annular-shaped body, wherein each flex recess is disposed between adjacent engagement tabs within each set of engagement tabs.

5. The retainer of claim 4, wherein each retaining tooth extends across an entire width of the respective engagement tab body.

6. The retainer of claim 5, where in each retaining tooth has a triangular prism shape.

7. A component retainer assembly, said assembly comprising:
   a component retainer comprising:
      a retainer annular-shaped body defining a central retainer aperture; and
      a plurality of engagement tabs extending substantially orthogonally from the retainer annular-shaped body, wherein each engagement tab comprises an engagement tab body and a retaining tooth integrally formed with the engagement tab body and extending radially inward toward a center of the central aperture; and
   an installation tool comprising:
      an installation tool annular-shaped body defining a central tool aperture; and
      a plurality of retainer retention and installation legs extending substantially orthogonally from the tool annular-shaped body.

8. The assembly of claim 7, wherein the retainer annular-shaped body comprises a plurality of flat sections and a plurality of arcuate spring features formed between the flat sections.

9. The assembly of claim 8, wherein the plurality of engagement tabs comprises a plurality of sets of engagement tabs comprising two or more adjacent engagement tabs.

10. The assembly of claim 9 further comprising a plurality of flex recesses formed in an inner perimeter edge of the retainer annular-shaped body, wherein each flex recess is disposed between adjacent engagement tabs within each set of engagement tabs.

11. The assembly of claim 10, wherein each retaining tooth extends across an entire width of the respective engagement tab body.

12. The assembly of claim 11, where in each retaining tooth has a triangular prism shape.

13. The assembly of claim 12, wherein each retainer retention and installation leg comprises a raised lip formed at a distal end the retainer retention and installation leg, wherein the raised lip defines a retainer retention channel disposed at the distal end of the retainer retention and installation leg.

14. The assembly of claim 13, wherein the installation tool further comprises a plurality of engagement tab receptacles formed between the retainer retention and installation legs.

15. A vehicle, said vehicle comprising:
    passenger compartment comprising a seating structure and a dash console; and
    a component retainer structured and operable to retain a threaded component within an opening in the dash console, wherein the component retainer comprises:
       a annular-shaped body defining a central aperture, the annular-shaped body and the central aperture defining a retainer body plane in which the annular-shaped body and the central aperture are disposed, the annular-shaped body having a flat first face and an opposing flat second face that are coplanar with the retainer body plane; and
       a plurality of engagement tabs integrally formed with and extending substantially orthogonally from the flat first face of the annular-shaped body, wherein each engagement tab comprises an engagement tab body and a retaining tooth integrally formed with the engagement tab body and extending radially inward toward a center of the central aperture.

16. The vehicle of claim 15, wherein the annular-shaped body comprises a plurality of flat sections and a plurality of arcuate spring features formed between the flat sections.

17. The vehicle of claim 16, wherein the plurality of engagement tabs comprises a plurality of sets of engagement tabs comprising two or more adjacent engagement tabs.

18. The vehicle of claim 17 further comprising a plurality of flex recesses formed in an inner perimeter edge of the retainer annular-shaped body, wherein each flex recess is disposed between adjacent engagement tabs within each set of engagement tabs.

19. The vehicle of claim 18, wherein each retaining tooth extends across an entire width of the respective engagement tab bod.

20. The vehicle of claim 19, where in each retaining tooth has a triangular prism shape.

* * * * *